July 10, 1956

C. R. KADDELAND 2,754,118

METHOD OF AND MEANS FOR REGISTERING
AND TRANSFERRING LAPPED SHEETS

Filed April 7, 1953

INVENTOR.
Christen R. Kaddeland
BY

Attorneys

July 10, 1956 C. R. KADDELAND 2,754,118
METHOD OF AND MEANS FOR REGISTERING
AND TRANSFERRING LAPPED SHEETS
Filed April 7, 1953 10 Sheets-Sheet 2
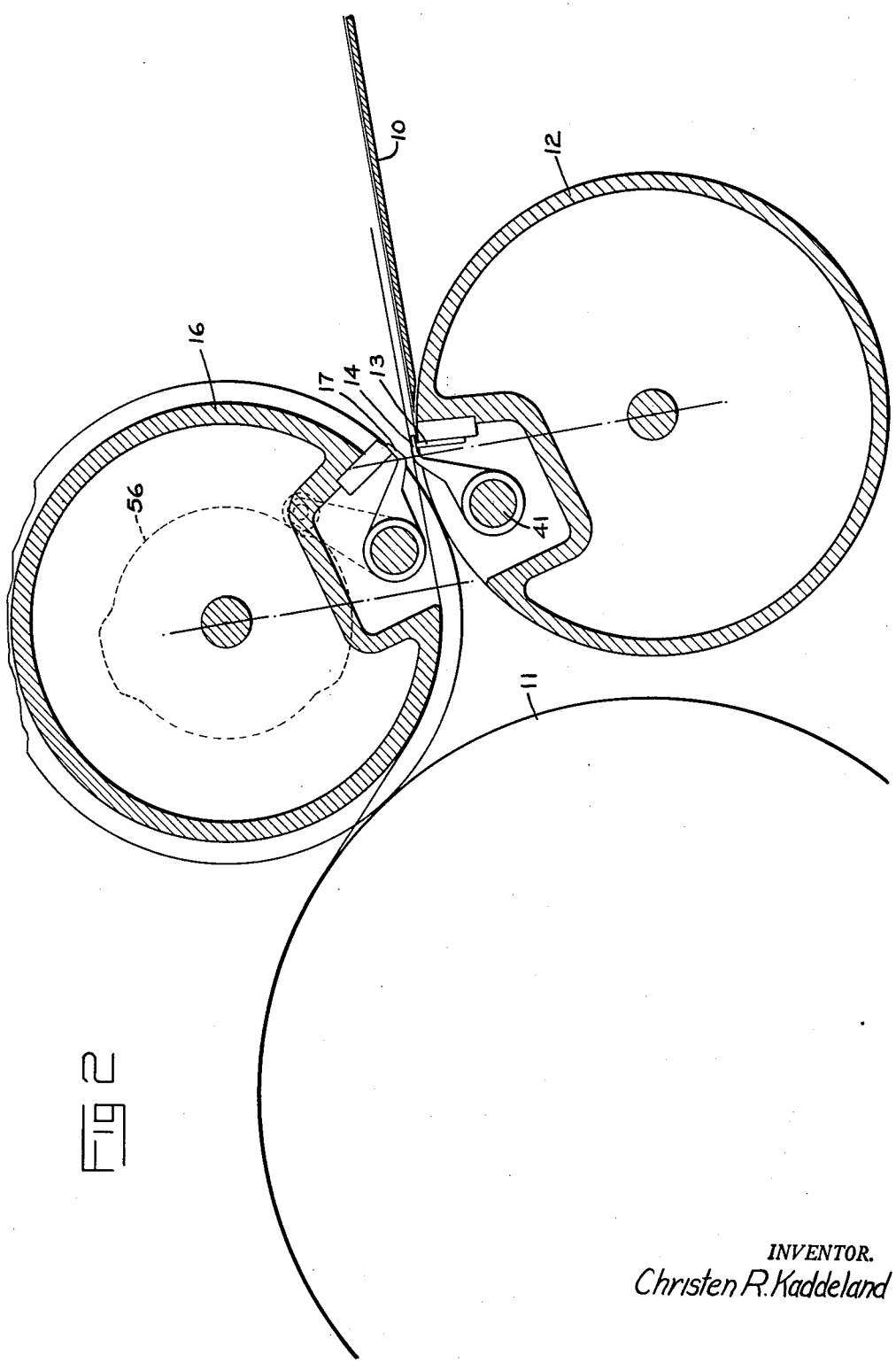
INVENTOR.
Christen R. Kaddeland July 10, 1956
C. R. KADDELAND
2,754,118
METHOD OF AND MEANS FOR REGISTERING
AND TRANSFERRING LAPPED SHEETS
Filed April 7, 1953
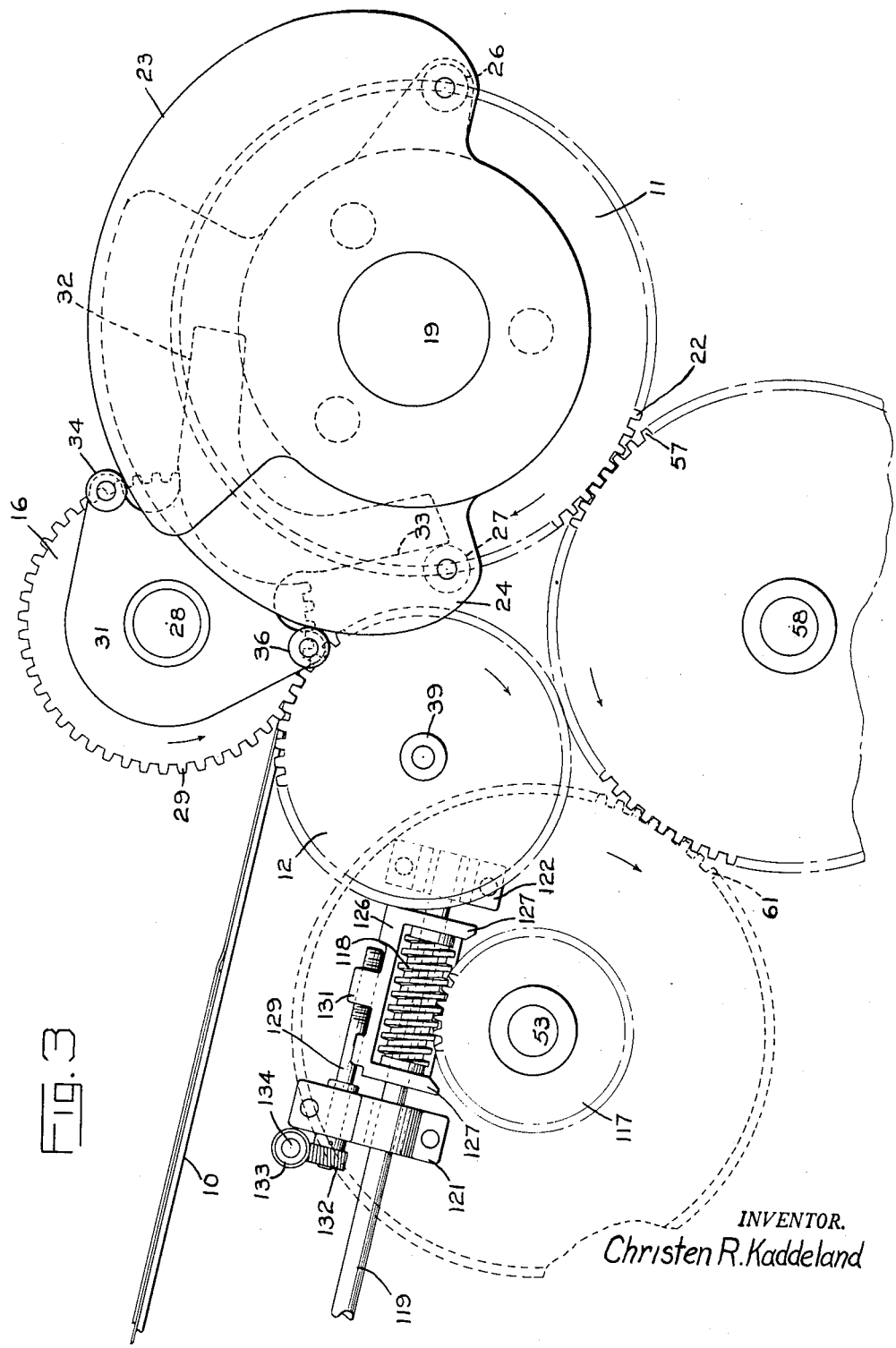
INVENTOR.
Christen R. Kaddeland July 10, 1956
C. R. KADDELAND
2,754,118
METHOD OF AND MEANS FOR REGISTERING
AND TRANSFERRING LAPPED SHEETS
Filed April 7, 1953
10 Sheets-Sheet 4
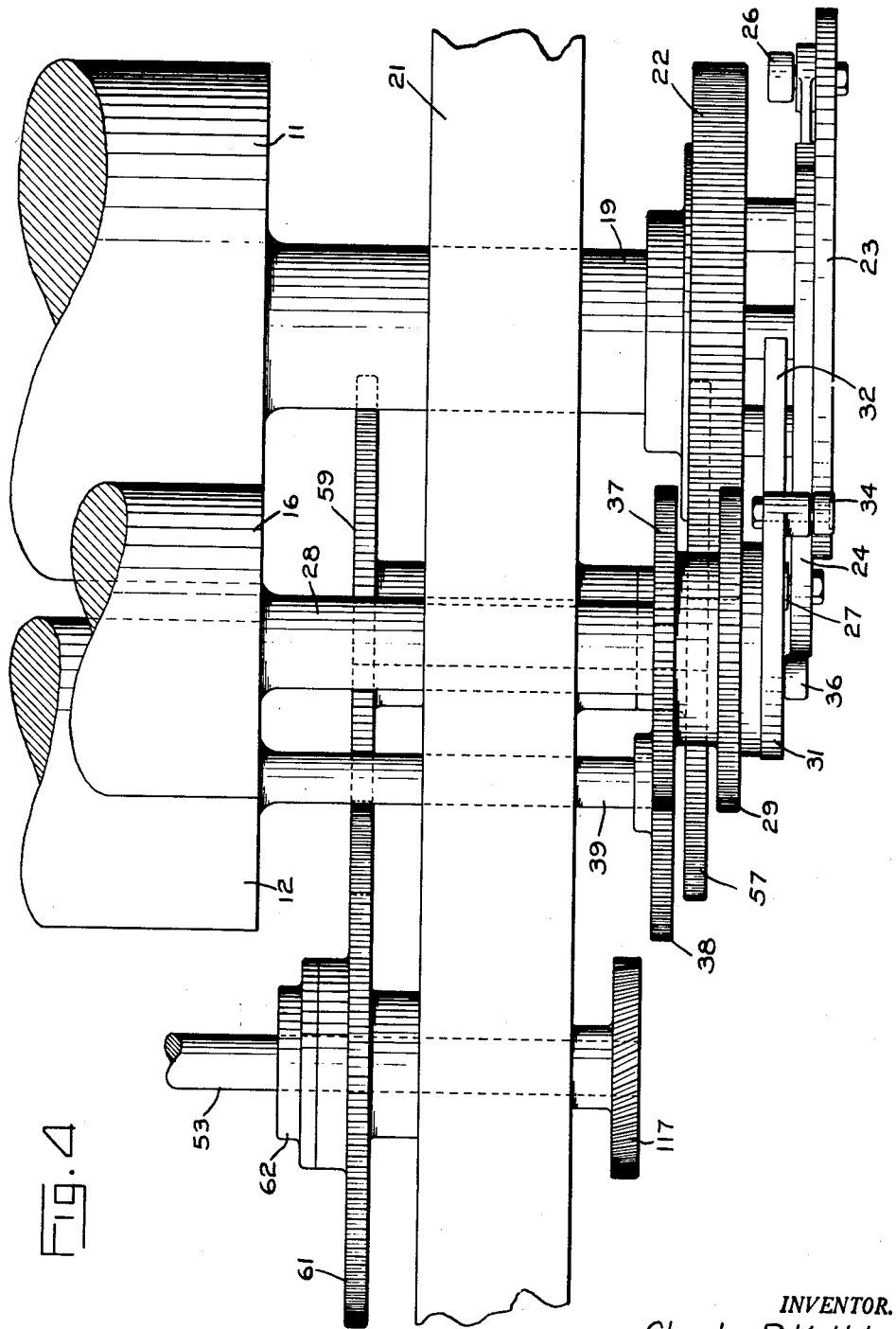
INVENTOR.
Christen R. Kaddeland

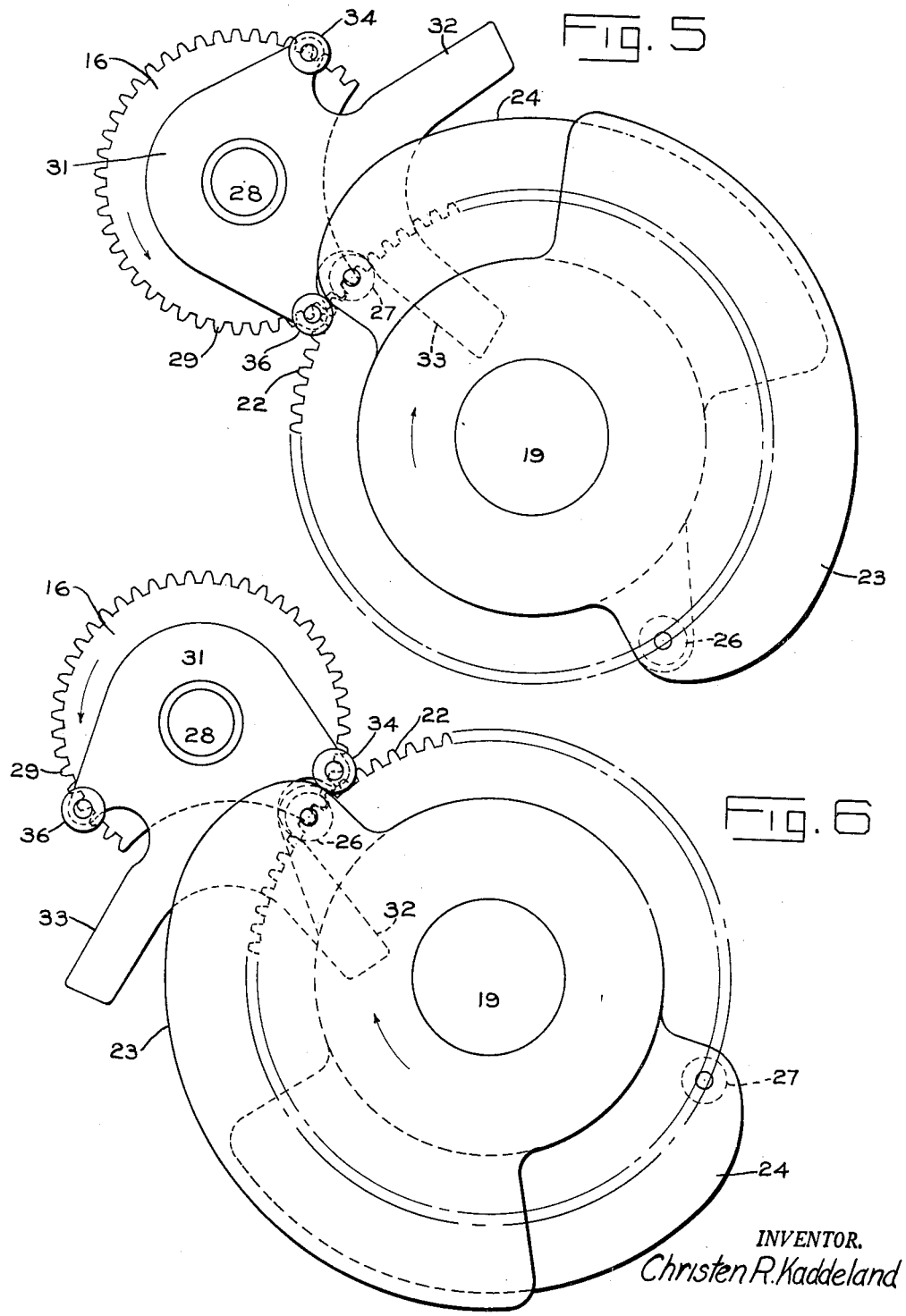

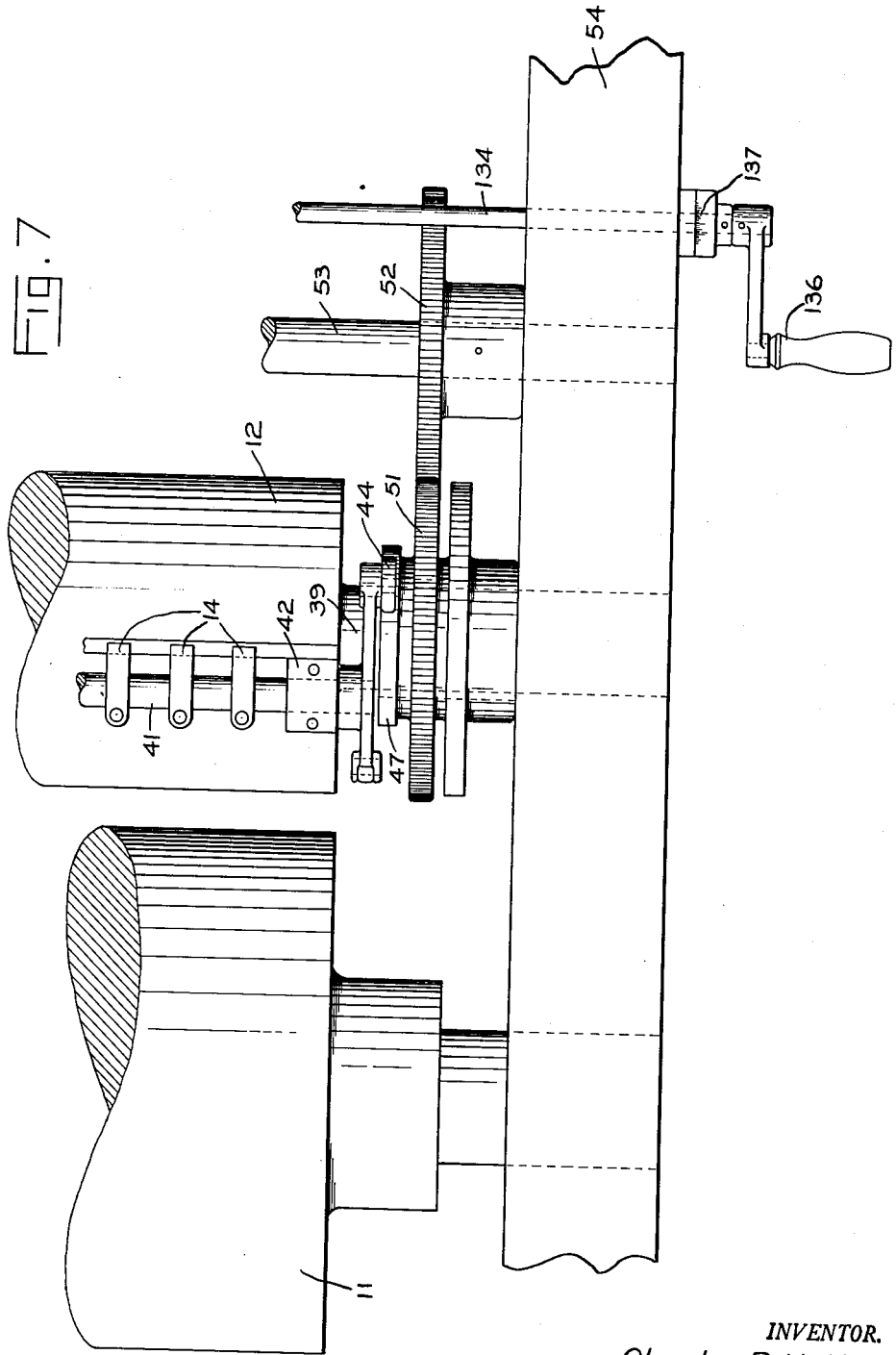

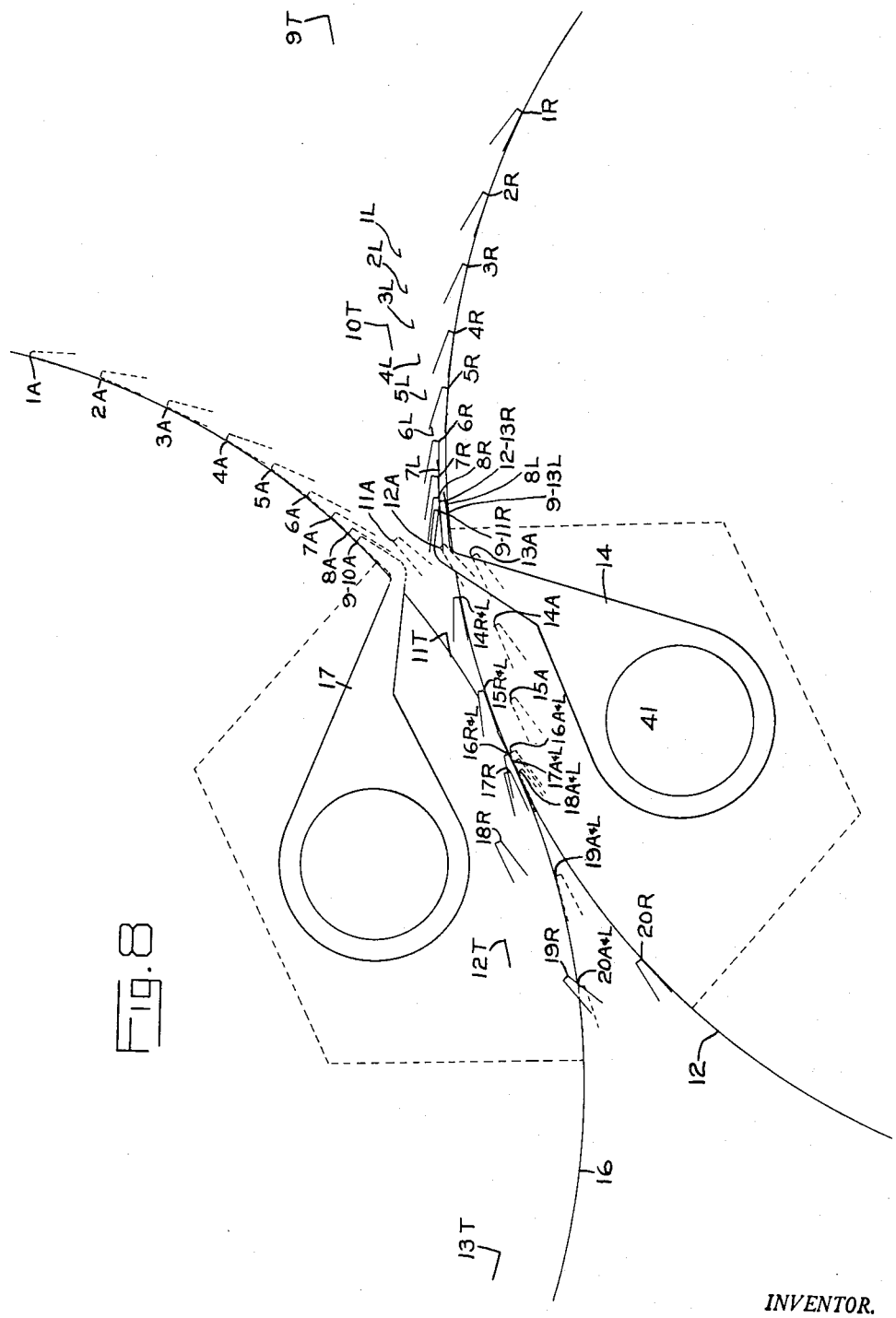

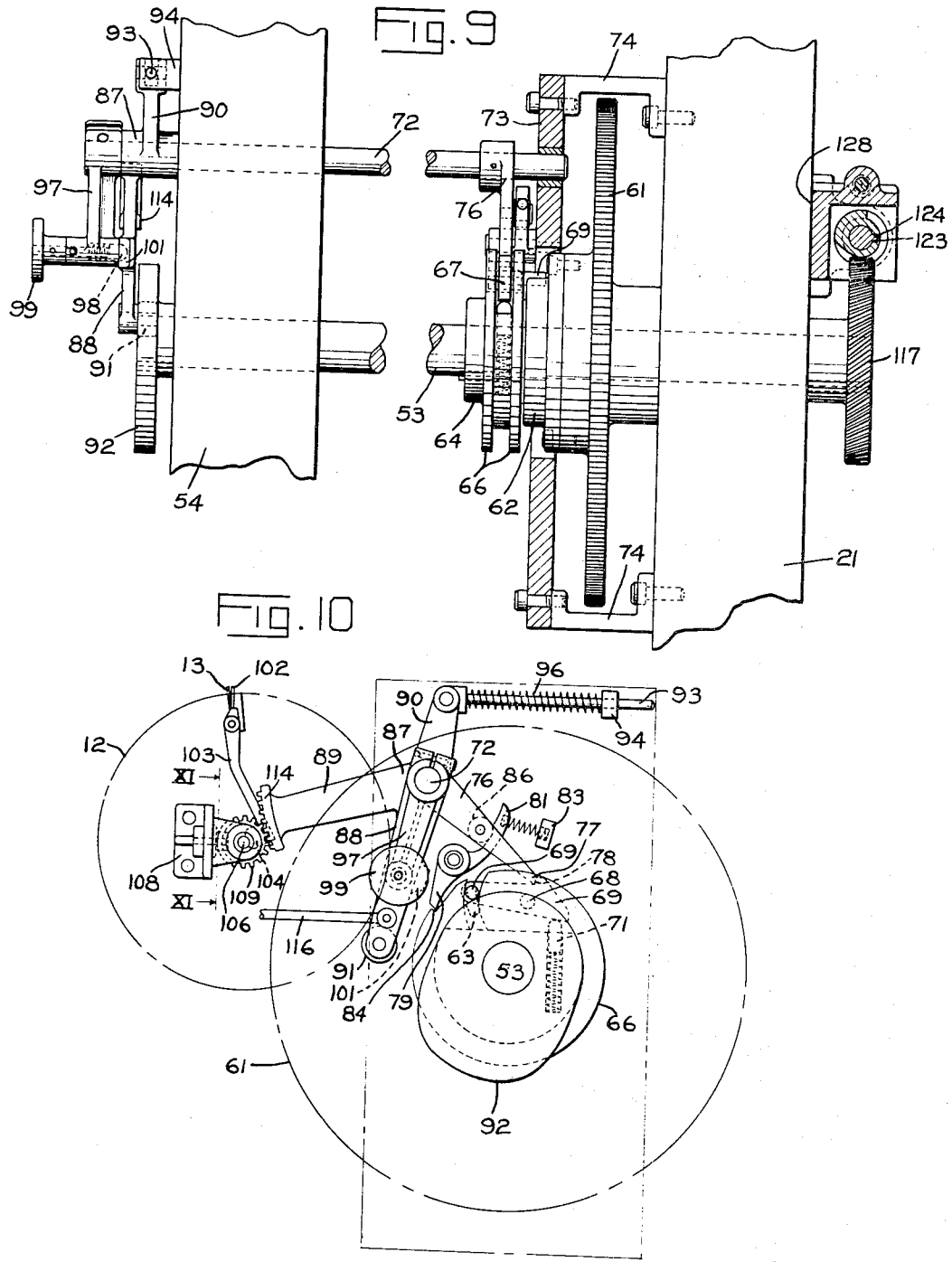

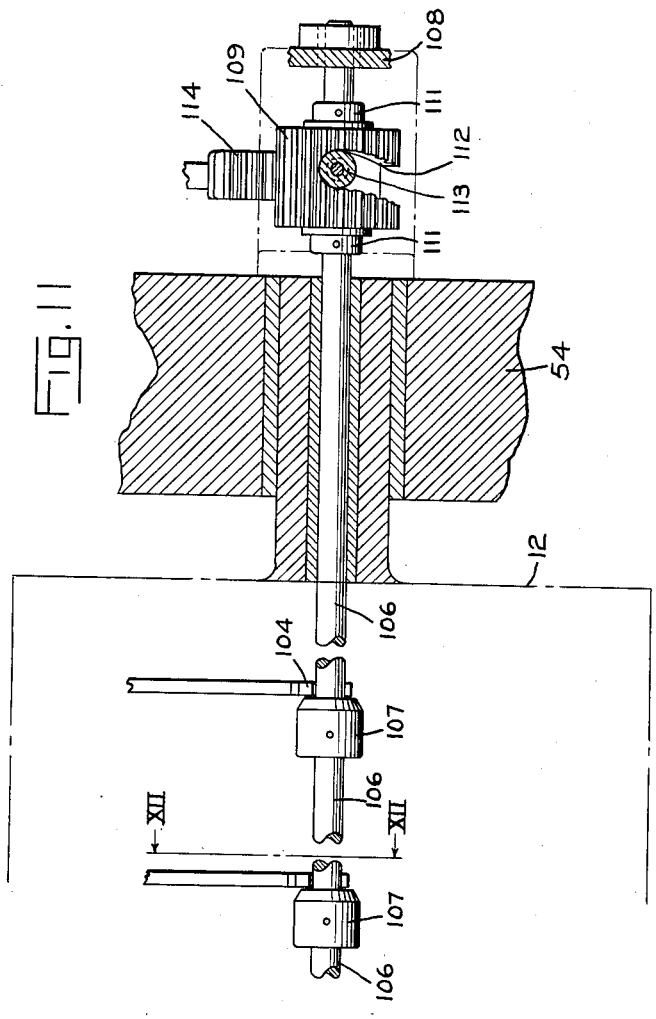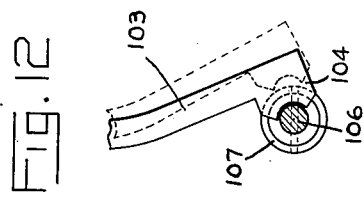
INVENTOR.
Christen R. Kaddeland

July 10, 1956
C. R. KADDELAND
2,754,118
METHOD OF AND MEANS FOR REGISTERING
AND TRANSFERRING LAPPED SHEETS
Filed April 7, 1953
10 Sheets-Sheet 10
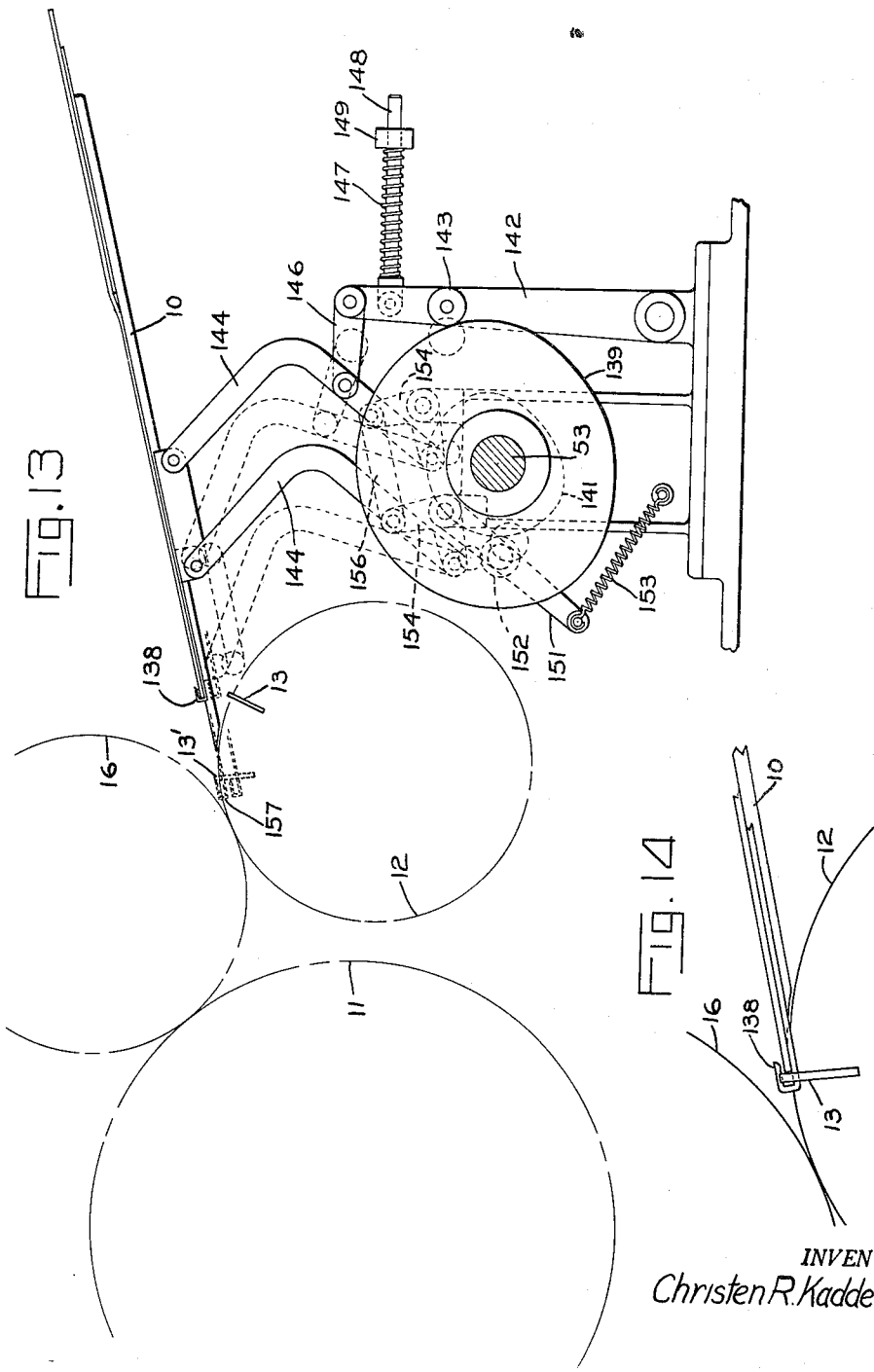
INVENTOR.
Christen R. Kaddeland

United States Patent Office 2,754,118
Patented July 10, 1956

2,754,118
METHOD OF AND MEANS FOR REGISTERING AND TRANSFERRING LAPPED SHEETS

Christen R. Kaddeland, Chicago, Ill., assignor to Miehle Printing Press & Manufacturing Company, Chicago, Ill., a corporation of Delaware Application April 7, 1953, Serial No. 347,280

17 Claims. (Cl. 271—53)

This invention relates to improvements in the method of and means for feeding a stream of lapped sheets to a printing press or the like machine and registering the individual sheets while in lapped sequence.

More specifically stated, the invention is directed to improvements in rotary sheet transfer mechanism whereby each individual sheet, in a stream of lapped sheets may be registered and thereafter engaged by the gripper elements of the transfer mechanism while the sheet is acclerated and transferred to a continuously rotating impression cylinder or any other conventional sheet carrying member.

The primary purpose of the improved sheet transfer mechanism is to make possible the transfer of sheets in rapid succession from a feed table to the grippers of a constant speed rotary cylinder, and to accelerate and transfer the sheets with the utmost precision and smoothness of operation in order to maintain the register relation of the sheets.

Rotary sheet transfer mechanisms of the general class to which my invention pertains, have been in use heretofore and are disclosed in earlier patents.

I make no claim to any of the features or combination of features described and covered in such patents. Reference is made for example to Patent 2,192,916 which covers an "accelerating feeder" invented and developed jointly by Charles W. Harrold and me. According to that patent the sheet transfer mechanism used is of the rotary type and the sheets are presented to the front registering guides while unlapped, that is to say, a sheet while being registered is completely uncovered by the preceding sheet.

Further, I refer to Patent 2,095,276 which affords broad protection for feeding sheets in lapped sequence and registering the individual sheets while still covered by a preceding sheet, in other words while still lapped. This procedure provides for added final registering time of the sheets. Patentee, in his sheet registering device, employs the oscillating type of sheet transfer gripper mechanism rather than the rotary type.

As indicated above, in order to increase the productivity of a printing press, it is extremely important that an optimum portion of time is made available for the purpose of registering the individual sheets.

To accomplish such advantage I have conceived an improved device which combines the desirable features of feeding and registering sheets in lapped sequence as applied to a rotary sheet transfer mechanism, and which device includes a number of novel features which shall be described herein in detail in connection with the preferred embodiment of my invention.

It is therefore, one of the primary objects of this invention to provide an improved, high-speed, rotary, sheet transfer device having operation whereby the leading edge of each individual sheet in a stream of lapped sheets is registered and gripped while still lapped by a portion of the preceding sheet to thereby make available as much time as possible for registration of the sheet.

Another important object of the invention is to provide an improved and novel method which includes the steps of engaging the foremost one of the lapped sheets, advancing that sheet at a linear velocity which is reduced with respect and directly related to the forward motion of the lapped sheets, then transferring the foremost sheet under positive control to a registering member which travels at such reduced velocity, stopping said member, imparting final registration to the sheet while still in lapped sequence, initially accelerating said member and therewith said sheet, transferring the registered sheet to a sheet advancing member, further increasing its acceleration until it reaches a predetermined speed and then transferring the sheet at such speed to a sheet carrying member of the machine.

Another salient object of the invention resides in the provision of an improved rotary sheet transfer mechanism of the general class set forth herein, including means for feeding and registering sheets in lapped sequence, and comprising the combination of two cooperating sheet advancing and registering cylinders, means for imparting to such cylinders intermittent, variable rotary motion in opposite directions, said motion including a period of acceleration, a period of full constant speed, a period of initial deceleration, a period of reduced constant speed, a period of final deceleration, and a period of rest.

Another object of the invention resides in the provision of an improved drive mechanism capable of imparting the required intermittent variable motion to the transfer members whereby registration of the sheets while lapped can be accomplished.

A still further object of the invention is to provide means for stopping the sheet feeding mechanism and associate apparatus, when a defective sheet is presented to the register guides, without however affecting the operation of the transfer device or the printing press until the preceding sheet has been completely printed.

Other objects, advantages, and novel features will appear from the following description of the preferred embodiment of my invention which is illustrated by way of example in the accompanying drawings, in which:

Figure 2 is a view similar to Figure 1, but at a somewhat enlarged scale and showing the position of the rotary sheet registering and transfer cylinders at the time when the sheet which has been transferred to the impression cylinder, is being withdrawn from the bank of lapped sheets;

Figure 3 is a view in elevation similar to Figure 1, but taken from the gear side of the press;

Figure 4 is a plan view taken of the gear side of the mechanism;

Figures 5 and 6 depict two different positions of the mechanism whereby rotary intermittent motion is transmitted to the sheet transfer members;

Figure 7 is a plan view showing certain details of the mechanism involved for adjusting the feeder, as depicted in elevation in Figure 3;

Figure 8 is a graphic illustration of the motion and relative position of the grippers whereby the sheets are transferred from the registering table to the sheet registering and transfer cylinders;

Figures 9 and 10 are front and side elevational views illustrating details of the detecting and tripping mechanism;

Figures 11 and 12 illustrate further details of the mechanism shown in Figures 9 and 10;

Figure 13 depicts in elevation a preferred means whereby each sheet is slowed down prior to being presented to the front registering guides, and Figure 14 is an enlarged view of part shown in Figure 13.

Figure 1:
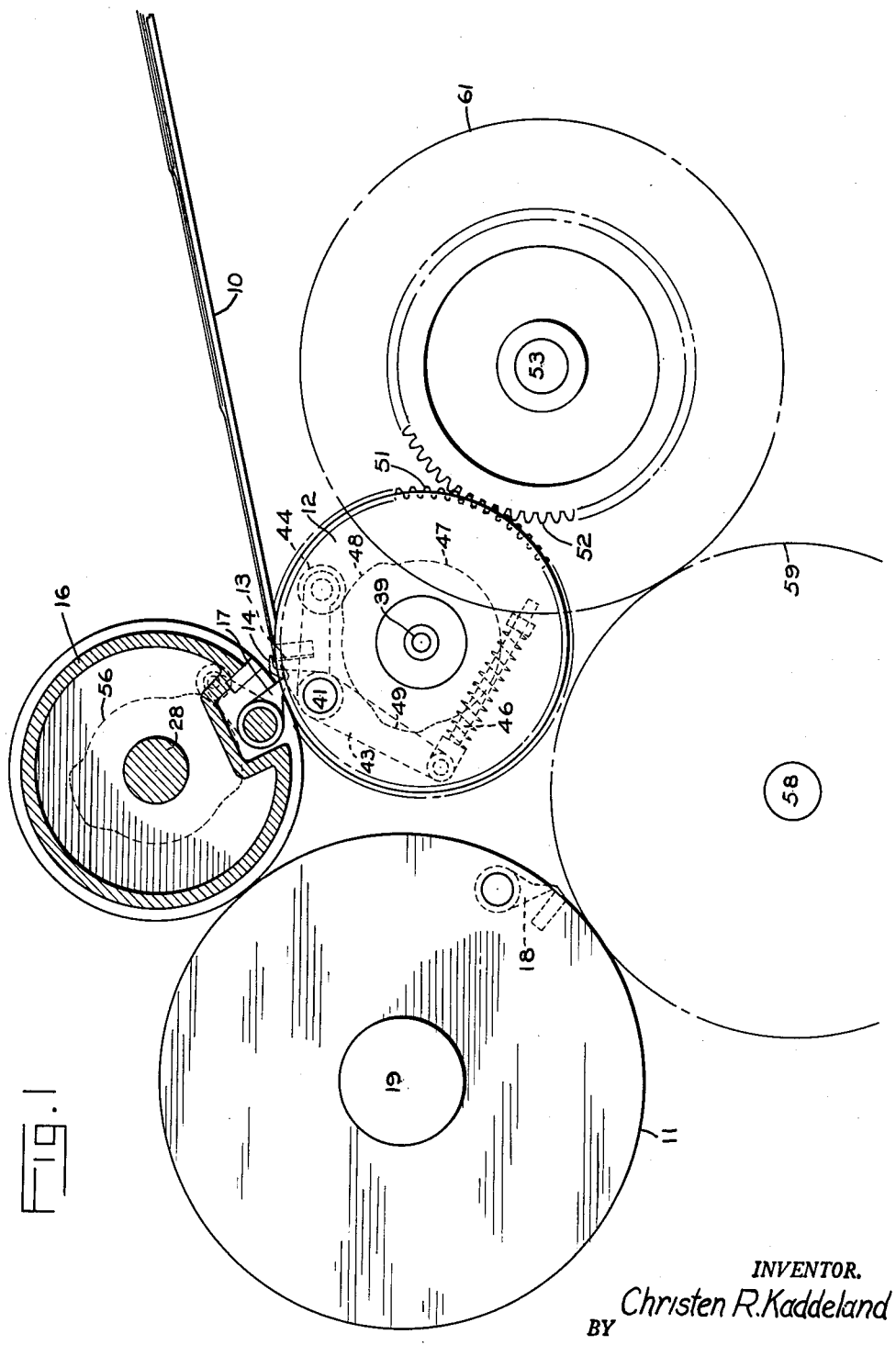
Figure 1 is a side elevational view, partly in cross section, taken from the feeder side of the press.

Referring now to Figure 1 of the drawings it will be seen that the sheets to be printed are fed in lapped relation over a feed table 10, and because of their lapped sequence, are advanced at a relatively low speed toward the impression cylinder 11. It will be understood, of course, that any conventional sheet separating and feeding means may be utilized for separating the individual sheets from a pile and whereby the sheets are forwarded in lapped sequence over the feed table 10. Such separating and forwarding means are well known in the art and therefore, because they form no part of the present invention, a detailed disclosure or specific description thereof is deemed unnecessary.

A sheet register cylinder 12 is journalled for rotation below the plane of the feed table and intermediate the end of said table and the impression cylinder 11, said register cylinder being equipped with front register guides 13, a plurality of which are arranged transversely of the path of the sheets and which are adapted to engage the leading edge of each succeeding sheets as it advances toward the impression cylinder 11. After a sheet is stopped by the registering guides 13, it is side registered by any conventional means, not shown, after which its leading edge is gripped by a series of gripper fingers 14 mounted in the gap of the register cylinder 12. Motion is then imparted to said cylinder to thereby effect initial acceleration of the sheet from its position of rest toward the impression cylinder.

A sheet advancing cylinder 16, journalled for rotation above the plane of the sheets and intermediate the register cylinder 12 and impression cylinder 11, is geared for rotation in unison with said register cylinder and is equipped with a series of gripper fingers 17.

It will be noted that the axes of the register cylinder 12 and the advancing cylinder 16 are offset with respect to the feed table 10, i. e., said axes are located in different planes perpendicular to said table, as shown in Figure 2.

This arrangement provides clearance whereby registration of a subsequent sheet can be effected while it is still overlapped by the trailing portion of a preceding sheet which is being withdrawn, without receding the gripper elements of the advancing cylinder.

After initial acceleration of the sheet and when the gripper fingers of the respective cylinders 12 and 16 reach the transfer point corresponding to a line between centers of said cylinders, the edge of the sheet is transferred from the register cylinder grippers 14 to the advancing cylinder grippers 17 whereupon said cylinders continue the acceleration of said sheet until it is traveling at a speed equal to the angular velocity of the impression cylinder. As the grippers 17 reach a line between centers of the impression cylinder and the advancing cylinder, the sheet is transferred to the impression cylinder grippers 18.

After the sheet has been transferred to the impression cylinder, the sheet advancing and register cylinders continue to rotate at impression cylinder speed for a short period, whereupon they enter a period of deceleration during which period their speed is reduced to a very low rate, and they continue to move at such reduced speed, which shall be referred to hereinafter as their uniform creep motion. During this period of reduced speed the next succeeding sheet advances to and engages the front guides on the register cylinder to effect front registration of said sheet while the preceding sheet is being withdrawn by the impression cylinder 11 and while a portion thereof still overlaps the leading edge of the succeeding sheet.

Thereupon, the two cylinders are again decelerated until they come to rest with the register cylinder 12 in its final register position with its grippers 14 opened and with the advancing cylinder stopped before reaching its sheet taking position with its grippers 17 closed, as shown in Figure 2. The two cylinders are adapted to remain at rest in such positions until final register of the next succeeding sheet is completed.

It will be apparent from the above description that, in one complete cycle of operation, the register and sheet advancing cylinders pass through six distinct periods of motion, namely a period of acceleration from a given starting point, a period of constant speed equal to the peripheral speed of the impression cylinder, a first period of deceleration, a period of uniform creep motion, a further period of deceleration, and a period of rest before starting the next cycle.

The mechanism whereby these various motions are imparted to the two cylinders will now be described with particular reference being had to Figures 3 to 6 inclusive. Although the motions of the register and advancing cylinders are intermittent and variable, they are, nevertheless, driven directly from the constant speed impression cylinder. The shaft 19 of said cylinder extends through the side frame member 21 and a drive gear 22 is fixed securely to the end thereof. Attached to the gear 22 are the complementary cams 23 and 24 which in turn carry a pair of cam follower rollers 26 and 27.

The shaft 28 of the advancing cylinder 16 also projects beyond the frame member 21 and it in turn is provided with a gear sector 29 to which is attached a bracket 31 having radially extending cam arms 32 and 33 and which bracket also carries a pair of cam follower rollers 34 and 36. The drive gear 22 and gear sector 29 are arranged to engage and drive the advancing cylinder during its period of constant speed whereas the various cams and their associated rollers are adapted to coact and control the advancing cylinder through its periods of acceleration, deceleration, uniform creep and rest.

The register cylinder 12 is driven in precise unison with the advancing cylinder 16 through the gears 37 and 38, the former being formed integral with the hub of gear sector 29 while the latter is fixed to the end of the shaft 39 of the register cylinder.

The manner in which the gears, cams and associated follower rollers function and coact to effect the desired motions of the sheet advancing and therewith the register cylinder, can best be understood by referring to Figures 3, 5, and 6.

In Figure 3, the respective cylinders and the drive mechanism therefor, are shown in the positions they assume during the stationary period of their cycle. It is during this period that final registration of the next sheet to be transferred is effected, the gripper fingers 14 of the register cylinder remaining open until such operation is completed. It will be noted also that the gripper fingers 17 of the sheet advancing cylinder are closed at this point and remain so until the trailing edge of the preceding sheet has cleared said gripper fingers and the front guides 13. The precise movements and timing of the respective gripper fingers with relation to the angular movements of their respective cylinders and the sheets on the feed table are extremely important and will be explained in detail hereinafter.

For the present, however, it will be understood that upon completion of the registering operations the grippers 13 will close on the leading edge of the sheet immediately before the register cylinder starts its next cycle of operation.

During the stationary period, the gear sector 29, see Figure 3, is in a position wherein the toothed portion of its periphery is disengaged from the drive gear 22 and the follower rollers 34, 36 on the bracket 31 are engaging concentric areas of their associated rotating cams 23 and 24 respectively, whereby the cylinders 12 and 16 are held motionless.

As the impression cylinder and therewith the cams 23, 24 continue to rotate, see Figure 3, the roller 27 on cam 24, will engage the cam arm 33 of bracket 31 whereupon continued rotation of cam 24 will effect a gradual acceleration of the advancing cylinder 16 which acceleration increases steadily as the roller 27 approaches a line between the centers of the cylinders 11 and 16.

During this period of acceleration, as roller 27 travels along cam arm 33, the roller 36 on bracket 31 will follow cam 24 and thereby maintain roller 27 in contact with cam 33.

The acceleration of the advancing and register cylinders continues until roller 27 reaches the innermost end of the cam arm 33 at which time the two cylinders are rotating at a surface speed equal to that of the impression cylinder, and which point in the cycle is illustrated in Figure 5. At this point, the first tooth of the gear sector 29 moves into engagement with the teeth of the drive gear 22 as the cam rollers 27 and 36 break contact with their respective cams 33 and 24, whereby cylinders 12 and 16 will be rotated at impression cylinder speed during the transfer of the sheet to be printed.

As the cylinders 12 and 16 reach the end of their constant speed period, the cam arm 32 engages the follower roller 26 at its innermost end, while roller 34 engages the sharply inclined portion of cam 23 as the teeth of gear sector 29 move out of mesh with the teeth of the drive gear 22, see Figure 6. The contour of the cams 23 and 32 is such that continued rotation of said cams with the impression cylinder effects a gradual deceleration of the register and advancing cylinders as roller 26 moves toward the outermost end of cam arm 32 and roller 36 moves into contact relation with the lead portion of cam 24.

The contours of the cams 23 and 24 are furthermore such that, after the initial deceleration of the register and advancing cylinders is effected by the coaction of cams 23, 32 and rollers 24, 26, the register and advancing cylinders are not brought to a complete stop, but are driven through the coaction of the rollers 36—34 and cams 23—24, at a very slow, constant speed, i. e., uniform creep motion. Thereafter, the design of cams 23 and 24 is such that the two cylinders are further decelerated and finally brought to rest as the followers 36—34 move onto concentric portions of said cams.

During each cycle of operation the gripper fingers 14 and 17 of the respective cylinders 12 and 16 must be controlled with extreme precision in order to clear the leading edge of each succeeding sheet as it moves toward the registering position and to effect accurate transfer of such sheet from the register cylinder to the advancing cylinder and thence to the impression cylinder. The means whereby such control is accomplished is best illustrated in Figures 1 and 7 wherein it will be seen that the grippers 14 of the register cylinder are mounted in spaced relation on a rock shaft 41 which is suitably journalled at each end in bearing blocks 42 on the register cylinder. A bell crank 43 is secured in position on the end of the shaft 41, and one arm thereof is provided with a roller 44. The other arm of said bell crank is connected with a conventional spring and rod assembly 46 which assembly constantly urges the bell crank and therewith the rock shaft 41 in clockwise direction, as viewed in Figure 1, to maintain the fingers 14 in closed position. A continuous cam 47 having nodes 48 and 49 is mounted for independent rotation on the register cylinder shaft 39 and is adapted to coact with the roller 44 to open the grippers 14 against the pressure of the spring 46 at the sheet taking and transfer points. The cam 47 is formed integral with the hub of a gear 51, Figure 7, which in turn meshes with a drive gear 52, mounted on the control shaft 53. The control shaft 53 is journalled for rotation in the side frame members 21 and 54 and is driven from the main drive mechanism as will be more fully explained hereinafter.

The paths followed by the respective gripper fingers 14, 17 and the positions of the sheets relative thereto are shown schematically in Figure 8, wherein the position of each element at a given point in the cycle is indicated by a common reference number. The numbers for the advancing cylinder grippers having the suffix A, the trailing edge of a preceding sheet the suffix T, the leading edge of the next succeeding sheet the suffix L and the register cylinder grippers the suffix R.

The positions indicated as 1A, 1L, and 1R in Figure 8 shows the relative positions of the respective gripper fingers and the leading edge of the next succeeding sheet at that point in the cycle wherein the register and advancing cylinder enter their initial deceleration period.

As the cylinders enter their period of deceleration it will be noted that the leading edge of the next succeeding sheet is advanced with relation to the register cylinder grippers and it remains so through positions 2, 3, 4 and 5. The speed of the grippers is such however, that at position 6, the register cylinder grippers overtake and pass the leading edge of the sheet and at this point node 48 of cam 47, Figure 1, moves under roller 44 to rock shaft 41 and thereby open the grippers 14. Precisely at this point the register cylinder enters its period of uniform creep motion during which period its surface speed is less than the lineal speed of the oncoming sheet. Consequently, with the grippers 14 open, the sheet advances under the grippers 14 to engage the front guides 13, Figure 1, whereby front registration of said next succeeding sheet can be effected while the register cylinder 12 is still moving and while the trailing portion of the preceding sheet still overlaps the front guides. The register cylinder grippers 14 are maintained in open position while said cylinder moves through its uniform creep period, positions 7 and 8, whereupon it is finally decelerated and comes to rest at position 9. As indicated in Figure 8, the register cylinder grippers, suffix R, remain open after the register cylinder has come to rest, or through positions 9 to 11, to allow the sheet to be side registered.

The advancing cylinder grippers 17, suffix A, in Figure 8, remain closed through positions 9 and 10 because the tail end of the preceding sheet has not been withdrawn sufficiently to clear said grippers. At the instant the tail end of the preceding sheet passes the grippers, as indicated as position 11, the advancing cylinder grippers begin to open to receive the registered sheet from the registering cylinder.

The advancing cylinder grippers continue their opening action through positions 12 and 13 until they clear the leading edge of the next sheet and project beyond the plane thereof. The register cylinder grippers are closed on the sheet and remain so while the advancing cylinder grippers are opening through positions 12 and 13.

Thereupon the two cylinders continue to accelerate with their respective gripper fingers moving substantially as shown through positions 14, 15 and 16. Position 16 is the point at which the leading edge of the sheet is transferred to the advancing cylinder and is momentarily held by both series of grippers. The register cylinder grippers continue opening through positions 17, 18 and 19 in order to clear the leading edge of the sheet as it follows the curve of the advancing cylinder. It will be understood that from position 13 on, the angular velocity of the two cylinders increases steadily so that the acceleration of the sheet from its position of rest on the feed table to the speed of the impression cylinder is effected in one continuous smooth operation.

From the foregoing explanation it will be apparent that the timing and precise movement of the respective gripper fingers is critical and must be controlled within extremely close limits. Furthermore, that it is essential to incorporate a uniform creep motion in the cycle of the cylinders in order that front registration of the sheets can be accomplished while they are still lapped by the preceding sheet thereby gaining more time for registration during the cycle of operation.

As was mentioned hereinbefore, the register cylinder gripper control cam 47 is rotated and controlled by a gear 52 mounted on the control shaft 53 which shaft is journalled for rotation in the side frame members 21 and 54.

Power for driving the control shaft 53 is derived from the impression cylinder gear 22, Figures 3 and 4, which drives the gear 57 mounted on the end of a stub shaft 58. This shaft is journalled in the frame member 21 and carries on its inner end a gear 59 which meshes with the control shaft drive gear 61.

The drive gear 61 is freely rotatable on the control shaft 53 and rotary motion of said gear is transmitted to the shaft through a releasable clutch mechanism whereby the control shaft and its associated mechanisms may be stopped with respect to the main drive means without affecting the rotary motion of the register, advancing and impression cylinders.

The hub of the drive gear 61 is provided with a collar 62, see Figures 9 and 10, having a groove or slot 63 formed in its periphery. Adjacent the collar 62 is a drive disc 64 which is secured to the control shaft 53 and which is formed with spaced flanges 66. A pawl 67 is pivotally mounted between said flanges on a short rod 68 and one end of said pawl carries a pin 69. This pin projects laterally beyond the flange 64 adjacent the collar 62 and is adapted to engage the slot 63 in the latter when the pawl 67 is in its drive position. As shown in Figure 10, the walls of flanges 68 are provided with arcuate slots to permit such rocking movement of the pawl 67 whereby the pin 69 can be moved in and out of its drive position. A spring urged pin 71 is mounted in a recess provided therefor in the drive disc 64 between the flanges 66 thereof, and beneath the opposite end of the pawl 67 to constantly urge said pawl in its drive position.

Under normal operating conditions, the pin 69 remains engaged in the slot 63 to thereby impart constant rotary motion to the control shaft 53. However, if a sheet is not brought into register with the front guides or if no sheet is presented thereto prior to the moment when the register cylinder starts its cycle of operation, the pin 69 is arranged to be tripped, i. e., removed from the slot 63, to thereby render the control shaft 53 inoperative.

As shown in Figure 9, a shaft 72 is mounted parallel to the control shaft 53 with one end thereof journalled for rotation in the side frame 54 while its opposite end is supported in a plate 73 which is fixed in position on the opposite frame member 21 by means such as the brackets 74.

A strip lever 76 is pinned to the shaft 72 in a manner that its free end 77 is aligned with the pawl 62 and, unless it is removed from the path thereof, is adapted to engage the notch 78 in said pawl to thereby trip pin 69 from the slot 63, see Figure 10.

Associated with the trip lever 76 is a dog 79 which functions to prevent any reverse movement of the control shaft 53 when the pawl 67 is tripped. The dog 79 is pivotally mounted on the plate 73 and is provided with a cam arm 81. A spring 82 interposed between said cam arm 81 and a boss 83 on the plate 73 urges said dog in counterclockwise direction to its operative position wherein it engages notch 84 formed in the flanges 66 of the drive disc 64. A roller 86 carried by the trip lever 76 coacts with the cam arm 81 to control the position of the dog 79 with relation to the position of the trip lever 76. When lever 76 is in its non-tripping position, i. e., out of the path of pawl 67, roller 86 engages the high part of cam arm 81 to hold dog 79 in its inoperative position, out of the path of the flanges 66.

When lever 76 is in its tripping position as shown in Figure 10, roller 86 moves to the low part of cam arm 81 thereby allowing dog 79 to engage notch 84.

The shaft 72, upon which the trip lever 76 is mounted, is adapted to have oscillating movement whereby said trip lever is moved into and out of the path of the pawl 67 once for each cycle of operation. One end of said shaft projects beyond the frame member 54, Figure 9, and carries a lever 87 which is free to rotate thereon and which is provided with three radially extending arms 88, 89 and 90, see Figure 10. Arm 88 is equipped with a roller 91 which is arranged to engage a cam 92 fixed to the end of the control shaft 53 beyond the frame member 54. A rod 93 is connected to the end of arm 90 with its free end slidably mounted in a boss 94 on frame member 54. A spring 96 mounted on the rod 93 between the boss 94 and lever 90 exerts pressure against said lever 90 to thereby normally maintain roller 91 in contact with cam 92. Consequently, when control shaft 53 rotates, a relative oscillating movement is imparted to lever 87.

Because lever 87 is freely rotatable on the shaft 72, motion thereof is transmitted to said shaft through the connecting lever 97. This lever is fixed in position on the end of the shaft 72 adjacent lever 87 and carries at its free end a spring urged pin 98 which is adapted to seat itself in a corresponding recess or opening in arm 88 of lever 87 when the said lever and arm are in alignment. When interlocked in such manner, lever 97 moves in unison with the lever 87 and, therefore, imparts its rocking motion to the shaft 72.

A knob 99 is provided whereby the pin 98 can be withdrawn from the opening in arm 88 in order to effect movement of the shaft 72 manually for the purpose of re-establishing rotation of shaft 53. Arm 88 is also provided with an inclined guide or ramp 101 which guides the pin 98 back into the seat in arm 88 whereby automatic operation is reassumed.

From the description thus far it will be apparent that by virtue of the rotating cam 92, the lever 89 and 97 coact to impart oscillating motion to the shaft 72 which in turn causes the end 77 of trip lever 76 to move into and out of the path of the rotating pawl 67 once for each cycle of operation. Such operation continues as long as each succeeding sheet is presented to the front guides 13 on the register cylinder 12. However, if a sheet is not in register or if no sheet is present at the front guides, the trip lever 76 will be caused to remain in the path of pawl 67 to thereby trip pin 69 from the groove 63 in collar 62 thereby rendering control shaft 53 inoperative.

The mechanism for effecting such tripping action operates automatically and is associated with the register cylinder for coaction with the third arm 89 of lever 87.

The presence at the guides of each sheet in turn is detected by fingers 102, pivotally mounted in the register cylinder 12. Each finger is formed with a relatively long depending arm 103, the free end of which extends inwardly adjacent the axis of the register cylinder and is formed to provide a stop 104, Figures 11 and 12. Mounted coaxially with the register cylinder 12 is a rod or shaft 106 which is slidably inserted in openings provided therefor in the register cylinder journals and which is adapted to have axial reciprocating motion independently of said cylinder. Collars 107 are pinned to said shaft adjacent the stops 104 of the detector arms 103.

One end of shaft 106 extends beyond the frame member 54 and is supported in a bracket 108. A pinion gear 109 is rotatably mounted on the shaft 106 and is maintained against axial movement thereon by collars 111. A curved cam track 112 is formed in the periphery of the pinion 109 in which a roller 113 rides, said roller being mounted for rotation about a fixed axis on the bracket 108. The pinion gear 109 is arranged to mesh with the sector 114 formed on the free end of arm 89 of lever 87.

It will be apparent, therefore, that as lever 87 oscillates, arm 89 thereof, through sector 114, will cause pinion 109 to oscillate about the axis of shaft 106. Due to the action of roller 113 in the cam track 112, such oscillating motion will cause shaft 106 to reciprocate axially in cylinder 12 and collars 107 will move back and forth past the stops 104 of the detectors 102.

The detector fingers 102 are balanced in a manner that they are normally advanced with respect to the register guides 13 whereby each oncoming sheet will contact said fingers immediately before they contact the guides and cause the fingers to pivot on their axis as the sheet moves against the guides. This swinging movement of the fingers moves the stops 104 out of the path of the collars 107 permitting shaft 106 to move axially under the force of the roller 113 in the cam track 112.

Conversely, if a sheet is not in register at the guides 13, at least one of the detector fingers will not be rocked about its pivot axis, with the result that its associated stops 104 will remain in the path of its respective collar 107 thereby blocking the shaft 106 from movement axially to the right as viewed in Figure 11. Consequently, the roller 113 will act as a lock in the cam track 112 restraining the pinion gear 109 against rotation on the shaft 106. The sector 114, Figure 10, and therewith arm 89 of lever 87, will be stopped against the force of spring 96 on arm 90 and shaft 72 will be prevented from turning counterclockwise. The trip lever 76, therefore, will remain in the path of pawl 67, tripping the pin 69 from the collar 62 and causing the control shaft 53 to stop.

Such tripping action will not affect the rotation of the register cylinder, or the transfer cylinder, which cylinders will continue through their normal cycles as will also the impression cylinder and the remainder of the printing press, until the last preceding sheet has received its impression. However, the rod 116 connected to arm 88 of lever 87, Figure 10, is arranged to actuate the press tripping mechanism thereby causing the press to be tripped after the preceding sheet has passed through the press.

As was explained hereinbefore in connection with Figure 1, the register cylinder grippers 14 are controlled by the rotating cam 47 which is driven by a gear 51 mounted on the control shaft 53. Consequently, when the control shaft is stopped, cam 47 will cease rotating and such action will take place while node 48 of said cam is under roller 44 and the grippers 14 are open. Therefore, the grippers 14 will be held open until after the cylinder 12 has started rotating and the misregistered sheet will remain on the feed table 10.

Although the sheet separating and feeding means for feeding the sheets to the feed table 10 forms no part of this invention, it will be understood that the timing and speed of such machine must be controlled with direct relation to the register cylinder 12. As shown in Figures 3 and 9, one end of the control shaft extends beyond the frame member 21 and has fixed thereto a worm gear 117 which is arranged to mesh with a worm 118 mounted on the feeder drive shaft 119, the latter being supported for rotation on said frame member by means of brackets 121 and 122. The worm 118 is provided with a full length internal keyway 123 which receives the pin or key 124 with sufficient clearance so that worm 118 may be adjusted axially on the drive shaft 119.

The position of the worm 118 on the shaft 119 is maintained by the bracket 126 which is formed with end members 127 between which the worm is confined. The bracket 126 is arranged to be adjustable axially of the shaft 119 in order to vary the position of worm 118 with relation thereto and whereby the timing of the feeder can be adjusted with respect to the registering mechanism. For this purpose, the back wall 128 of the bracket is provided with a smoothly machined surface which bears against the frame member 21 thereby facilitating movement of said bracket when the latter is adjusted axially on the shaft 119 while at the same time preventing any rotation of said bracket with the shaft. The position of the bracket is in turn adjusted and maintained by means of the screw member 129 which is threaded into a boss 131 on the bracket 118. The screw member 129 is journalled in the supporting bracket 121 and maintained against axial movement therein and its free end carries a worm 132 which in turn meshes with a companion worm 133 mounted on the transverse shaft 134. The latter shaft is journalled in the frame members 21 and 54 and, as shown in Figure 7, extends beyond the frame member 54 on the opposite side of the press to receive a crank 136 and a calibrated collar 137. By turning crank 136, the pressman can adjust the position of the worm 118 on the drive shaft 119 to thereby advance or retard the feeding of the sheets within micrometric limits whereby to control the sheets on the feed table with respect to the register cylinder 12. It is also obvious that when the control shaft 53 is tripped the feeder will be stopped simultaneously.

The feed table 10, Figure 13, is provided with a series of synchronizing hooks 138 which are adapted to intercept the forward movement of each succeeding sheet and thus prevent said sheets from reaching the front register guides 13, mounted in the rotating sheet register cylinder 12, until the former are in position to further intercept said sheets and complete their retardation until said sheets are stopped for side registration.

It will be understood that during the transfer of the sheet control from the synchronizing hooks 138 to the front registering guides 13, the registering cylinder 12 is traveling at its slow creep speed, with the synchronizing hooks slightly in the lead, and that during sheet detection, the synchronizing hooks remain stationary, slightly in advance of the register guides 13, a position indicated by 13' in broken lines on Figure 13 and to an enlarged scale in Figure 14.

After the register cylinder and therewith the sheet stops for side registration and simultaneous sheet detection, the synchronizing hooks 138 will remain stationary slightly in advance of the guides 13, during the sheet detecting period, and then, unless control shaft 53 is stopped by tripping, advance until the top portion of the hook 138 will clear the front edge of the sheet.

The hooks are then receded beneath the sheet and returned to their sheet engaging position beneath the surface of the table 10, after which they are again projected above the table to engage the next succeeding sheet while the preceding sheet is being withdrawn.

The various movements of the synchronizing hooks are controlled by the cams 139 and 141 which are mounted to rotate with the control shaft 53. Cam 139 is arranged to actuate the pivotally mounted lever 142 which carries the roller 143 and is connected to said hook supporting members 144 by the link 146 to move the hooks forward and back in paths substantially parallel to the surface of the table 10. The spring 147 mounted on the shaft 148 acts against the boss 149 to maintain the roller 143 in contact with cam 139.

The lowering and raising movement of the hooks is accomplished by the cam 141 which actuates the lever 151 through the roller 152 against the tension of spring 153. Movement of lever 151 oscillates the bell cranks 154 which are connected together by the link 156 and which pivotally support the hook supporting members 144. As the bell cranks 154 oscillate, they raise and lower the pivot axis of the supporting members 144, thereby raising and lowering said hooks in proper timed relation to their forward and reverse movements, as well as with relation to the sheets on the feed table 10.

When control shaft 53 is stopped at this point by action of the sheet detectors, the hooks will maintain the sheet against further movement.

*Operation*

Referring to Figure 13, it is assumed that the first sheet has been conveyed over the feed table 10, and has already been engaged by the synchronizing hooks 138 for presentation to the front guides 13. Thereupon, front guides 13 intercept the forward path of the synchronizing hooks 138, to assume control of the sheet, bringing it to its registering stop position indicated as 13' in which position hooks 138 are slightly in advance of the guides 13 as indicated more clearly in Figure 14.

At this point in the cycle of operation, the register cylinder 12 is stationary and the grippers 14 are held open.

If the sheet at the guides 13 is in proper register, the detectors 102, Figure 10, will be pivoted about their pivot axis thereby moving the stops 104 on the depending ends thereof, out of the path of the collars 107 on the reciprocable shaft 106, Figures 11 and 12. Consequently, the shaft 106 will be free to move axially as the pinion 109 is rotated thereon and the roller 113 effects a lateral reciprocation of shaft 106 due to the contour of the cam track 112.

Likewise the arm 89, Figure 10, carrying the gear segment 114 will be free to rock with the shaft 72 due to the pressure of the spring 96 acting on arm 90 and the end 77 of trip pawl 76 will be moved out of the path of the drive pawl 67 so that the pin 69 will remain engaged in the slot 63 of the collar 64 and the control shaft 53 will continue its rotary motion.

By the time the above operations have been completed, the drive mechanism will have reached the position illustrated in Figure 3, wherein the roller 27 engages the cam 33 and roller 36 has reached the declining portion of cam 24. As the roller 27 travels along the cam 33, it drives said cam and therewith the register and transfer cylinders, the speed gradually increasing as the roller 27 moves inwardly toward the axis of the transfer cylinder 16. During this period of acceleration the roller 36 travels down the declining portion of cam 24 thereby positively controlling the acceleration of the cylinders 12 and 16 by maintaining contact between the roller 27 and cam 33.

While the cylinders 12 and 16 are being accelerated to the speed of the impression cylinder 11 the sheet is transferred to the grippers 17 on the transfer cylinder 16, see Figures 1 and 2.

Shortly after the sheet is transferred to the transfer cylinder, the roller 27 reaches the inner end of cam 33 at which point the constant full speed motion of the cycle begins as the teeth of segment 29 begin to mesh with the drive gear 22, see Figure 5.

After the cylinders 12 and 16 have travelled a short distance at impression cylinder speed, the grippers 17 on the transfer cylinder and the grippers 18 on the impression cylinder arrive at a position in line with the centers of the two cylinders, whereupon the grippers 17 open to release the sheet while the grippers 18 close on it to carry the sheet through the press to receive an impression.

The constant speed period of rotation of the register and transfer cylinders continues until they have rotated through a substantial portion of a revolution and until the teeth of the segment gear 29 move out of mesh with the drive gear 22. At this point the roller 34 starts up the inclined portion of cam 23 as roller 26 engages cam 32, see Figure 6. As roller 26 moves toward the outer end of the cam 32 and roller 34 travels over said inclined portion of cam 23, the cylinders 12 and 16 enter their initial period of deceleration during which period their speed is gradually reduced until the rollers 34 and 36 are both in contact with the respective cams 23 and 24 at which point said cylinders begin their period of uniform creep motion. As explained hereinbefore, the contours of cams 23 and 24 are such that the register and transfer cylinders do not come to a complete stop after the initial deceleration, but continue moving at a slow speed. This uniform creep motion is essential in order to permit front registration of sheets while in motion, thereby affording more time for registering the sheet while the preceding sheet is being withdrawn.

Thereafter, the rollers 34 and 36 move onto the concentric portions of the cams 23 and 24, thereby effecting a stoppage of the cylinders 12 and 16, as shown in Figures 1 and 2, thereby permitting side registration of the sheet while it is stationary.

In the event that the next succeeding sheet to be transferred is not in proper register at the front guides 13, the mechanism will be tripped and the following actions will take place.

If the sheet is out of register at the front guides 13, at least one of the detector fingers 102 will not be rocked about its pivot axis, Figure 10, with the result that its associated stop 104, see Figures 11 and 12, will remain in the path of its respective collar 107 thereby locking the shaft 106 against axial movement to the right, as seen in Figure 11. Therefore, the pinion 109 will be restrained against rotation due to the locking action of the roller 113 in the cam track 112, and pinion 109 will be locked against rotation. Consequently, the arm 86 carrying the gear segment 114 will be held stationary against the pressure of spring 96 on arm 88 and roller 91 will not move to the low part of cam 92, Figures 9 and 10. It will be obvious that when the bell crank 87 is held stationary in such position and as shown in Figure 10, the trip pawl 76 will then remain in the path of the drive pawl 67 so that its end 77 will engage the notch 78 as the drive disc 64 rotates. As a result, pawl 67 will be pivoted about the shaft 68 against the pressure of the spring urged plunger 71 and pin 69 will be disengaged from the slot 63 in the drive collar 62. Moreover, because the trip pawl 76 is not moved, the roller 86 will not ride to the high part of the cam arm 81 and the locking pawl 79 will move into the notch 84 in the drive disc 64 to prevent reverse movement thereof. With the drive pawl 67 in this position, all motion of the cam shaft 53 ceases, although the register and transfer cylinders continue normal operation.

While the register cylinder 12 continues through its normal function, no sheet will be transferred to the impression cylinder 11 because stoppage of control shaft 53 prevents the closing of register cylinder grippers 14, and also stops the sheet forwarding devices, including the sheet synchronizing hooks.

In order to start normal operation after the mis-registered sheet is removed and before another sheet is in position at the front guides 13, the knob 99, Figures 9 and 10, is withdrawn to remove the pin 98 from the recess in arm 88 whereupon the arm 97 is then moved counter-clockwise. This action rocks the shaft 72 thereby moving the end 77 of trip lever 76 from the notch 78 in pawl 67 so that pin 69 will be released and the force of plunger 71 will cause it to again engage the slot 63 of collar 62 to drive the cam shaft 53. Movement of trip lever 76 also causes roller 86 to move pawl 79 to its disengaged position.

The bell crank 87 and the associated sheet detecting mechanism on the register cylinder will remain locked in position until the next registered sheet engages the detectors 102 to thereby move the blades 104 from the path of the collars 107. Thereafter, pinion 109 will be free to oscillate and the spring 96 will maintain roller 91 in contact with cam 92. Moreover, as roller 91 moves to the low part of cam 92, the pin 98 will ride up the ramp 101 on lever 88 and drop into the recess in said lever in order to again set up the tripping mechanism for the next cycle of operation.

I wish it to be understood, that while I have disclosed herein the basic principle of my invention and details of a preferred embodiment thereof, it is my desire to cover any modifications and improvements in structure that will come within the terms and scope of the appended claims.

I claim:

1. In a printing press the combination comprising, an impression cylinder, a sheet feeder including means for forwarding a stream of sheets in lapped sequence toward said cylinder, and sheet transfer mechanism for transferring each sheet from said means to said cylinder, said mechanism including an intermittently rotatable member journalled for rotation about an axis below the path of sheet travel, drive means interconnected with the cylinder for positively controlling the intermittent rotary motion of said member with relation to said cylinder, and means mounted on said member for engaging and registering each sheet in succession while its leading edge is still lapped by a portion of a preceding sheet.

2. The combination as set forth in claim 1, wherein means is provided for stopping said member periodically to thereby permit side registration of each sheet while it is at rest.

3. The combination as set forth in claim 2, in which means is provided for intercepting each lapped sheet in succession as it moves toward said cylinder and having operation to positively control its forward progress for timed engagement with the means mounted on said member.

4. In a printing press the combination comprising, an impression cylinder, means for advancing sheets to be printed toward said cylinder, mechanism including a pair of oppositely rotatable transfer cylinders for transferring each sheet in succession from said means to said impression cylinder, a longitudinal gap in the periphery of each transfer cylinder, drive means interconnected with the impression cylinder for imparting rotary motion to said transfer cylinders, and means included in said drive means for stopping the transfer cylinders periodically with said gaps adjacent the path of sheet travel whereby space is provided for the trailing portion of each sheet to pass between said transfer cylinders after its leading edge has been transferred to, and the sheet is being withdrawn by, the impression cylinder.

5. In combination with a printing press having a continuously rotating impression cylinder, means for forwarding a stream of lapped sheets toward said cylinder, mechanism including a sheet registering cylinder and a sheet advancing cylinder for transferring the sheets in sequence from said means to said impression cylinder, said registering and advancing cylinder each having a gap in its peripheral surface, means on said registering cylinder for engaging and registering each sheet in succession while its leading edge is still lapped by a portion of a preceding sheet, and drive means interconnecting said registering and advancing cylinder with said impression cylinder whereby intermittent, variable, rotary motion is imparted to said registering and advancing cylinders, said drive means being adapted to stop said latter cylinders in a sheet registering position wherein said gaps are adjacent each other to thereby provide clearance for the trailing portion of a previously transferred sheet to pass between said cylinders while the next sheet is being registered.

6. In a rotary sheet transfer mechanism for registering sheets and transferring them from a feed table to a rotating impression cylinder of a printing press, the combination comprising a sheet registering cylinder having operation to register each successive sheet while it is at rest and thereafter initially advance it toward said impression cylinder, a cooperating sheet advancing cylinder for transferring each registered sheet from the registering cylinder to the impression cylinder, and drive means interconnected with said impression cylinder for imparting to said registering and advancing cylinders, intermittent, variable, rotary motion in opposite directions whereby in each cycle of operation said latter cylinders pass successively through a period of acceleration, a period of constant, full speed, a period of initial deceleration, a period of reduced constant speed, a period of final deceleration, and a period of rest.

7. In a rotary sheet transfer mechanism for registering lapped sheets and transferring them from a feed table to a continuously rotating impression cylinder of a printing press, the combination comprising, a sheet registering cylinder for registering each sheet while it is still lapped by a preceding sheet, and thereafter initially advancing it toward said impression cylinder, a cooperating sheet advancing cylinder for transferring each registered sheet from said registering cylinder to the impression cylinder, and drive means interconnected with said impression cylinder for imparting to said registering and advancing cylinders intermittent, variable, rotary motion in opposite directions, said motion including in succession a period of acceleration, a period of full, constant speed, a period of initial deceleration, a period of reduced constant speed, and a period of final deceleration.

8. In a rotary sheet transfer mechanism for registering lapped sheets and transferring them from a feed table to a continuously rotating impression cylinder of a printing press, the combination comprising, a sheet registering cylinder for registering each sheet while it is still lapped by a preceding sheet and thereafter initially advancing it toward said impression cylinder, a cooperating sheet advancing cylinder for transferring each registered sheet from said registering cylinder to the impression cylinder, said registering cylinder being mounted for rotation below the plane of travel of the fed sheets and the sheet advancing cylinder being mounted for rotation above said plane, and continuously rotating drive means having operation to impart intermittent, variable, rotary motion in opposite directions to said registering and advancing cylinders, said motion including in succession a period of acceleration, a period of full constant speed, a period of initial deceleration, a period of reduced constant speed, a period of final deceleration, and a period of rest.

9. In a printing press the combination comprising, an impression cylinder, a sheet feeder including advancing means for forwarding sheets toward said cylinder, sheet transfer mechanism for transferring the sheets in regular order from said advancing means to said impression cylinder, said mechanism including a rotary member journalled for rotation about an axis below the path of sheet travel, guides on said member for registering each sheet presented thereto, drive means for imparting intermittent, variable, rotary motion to said member whereby in each cycle of operation said member passes successively through periods of acceleration, constant full speed, initial deceleration, uniform reduced speed, final deceleration, and rest, and means associated with said advancing means for intercepting each sheet as it moves toward the cylinder to positively control its forward progress for timed engagement with the guides on said member while said member is moving at reduced speed.

10. In a rotary sheet transfer mechanism for registering lapped sheets and transferring them in sequence from a feed table to the sheet carrying cylinder of a printing press, the combination comprising, a first rotary member having a sheet taking position with respect to said feed table, a second rotary member having a sheet taking position with respect to said first rotary member, continuously rotating drive means for imparting to said members intermittent, variable, rotary motion in opposite directions to each other whereby in each cycle of operation said members pass from a given starting point through a period of acceleration, a period of constant, high speed motion, a period of initial decelerating motion, a period of reduced speed motion, a period of final decelerating motion to said starting point, and a period of rest between said final decelerating motion and the next succeeding cycle of operation, during said period of rest said first member being stopped in its sheet taking position whereas said second member is stopped at a point to the rear of its sheet taking position.

11. A sheet transfer device for transferring sheets from a feed table over which the sheets are conveyed in lapped relation with the leading edge of each subsequent sheet being overlapped by the trailing end of the preceding sheet, to a continuously rotating impression cylinder comprising in combination, a first sheet advancing member having gripper elements for taking the sheets from said feed table, a second sheet advancing member having gripper elements for taking sheets from said first member and transferring them to said impression cylinder, said first and second sheet advancing members being geared together for intermittent uni-directional rotation in opposite directions to each other, and means including coacting cams, cam followers, and gears inter-connecting said continuously rotating impression cylinder with said second sheet advancing member for driving both said sheet advancing members, whereby in each cycle of operation said members pass through periods of accelerating motion, constant speed motion at cylinder speed, first decelerating motion, uniform creep motion, a second decelerating motion and a period of rest.

12. In a printing press, the combination comprising, an impression cylinder, feed means for advancing a stream of lapped sheets toward said cylinder, transfer means including a sheet register cylinder for transferring the sheets in regular sequence from said feed means to the impression cylinder, drive means for imparting intermittent variable rotary motion to the register cylinder including periods of uniform reduced speed, final deceleration and rest, guide means mounted for bodily movement with the register cylinder, and means associated with said feed means having operation to engage, initially retard and transfer control of each sheet to said guide means while said guide means are moving with the register cylinder at said reduced speed, said guide means effecting final deceleration and stoppage of the sheet for front and side registration while it is still lapped by a preceding sheet.

13. In a rotary sheet transfer mechanism for registering lapped sheets and transferring them in regular sequence from a feed table to the impression cylinder of a printing press, the combination comprising, an intermittently rotating, variable speed sheet registering cylinder for registering each sheet while it is still overlapped by a preceding sheet, and a cooperating sheet advancing cylinder geared for rotation in unison with the registering cylinder and having operation to transfer each registered sheet from the registering cylinder to the impression cylinder, the axes of said register and advancing cylinders being located in different planes perpendicular to said feed table whereby registration of a subsequent sheet can be effected while the trailing portion of a preceding sheet is being withdrawn and still overlaps said subsequent sheet.

14. In a rotary sheet transfer mechanism for registering lapped sheets and transferring them in regular sequence from a feed table to the impression cylinder of a printing press, the combination comprising, an intermittently rotating, variable speed sheet registering cylinder for registering each sheet while it is still overlapped by a preceding sheet, and a cooperating sheet advancing cylinder geared for rotation in unison with the registering cylinder and having operation to transfer each registered sheet from the registering cylinder to the impression cylinder, the axes of said registering and advancing cylinders being located respectively below and above said feed table in different planes perpendicular to said feed table whereby registration of a subsequent sheet can be effected while the trailing portion of a preceding sheet is being withdrawn and still overlaps said subsequent sheet.

15. The method of feeding a stream of lapped sheets to the impression cylinder of a printing press, comprising the steps of advancing said sheets in stream formation toward said cylinder, initially retarding the forward motion of the foremost sheet, finally stopping the forward motion of said sheet, side and front registering the sheet while it is at rest and while it is still lapped by the trailing portion of a preceding sheet, thereafter initially accelerating said sheet in an arcuate path, further accelerating said sheet in a divergent arcuate path until it is traveling at cylinder speed, and transferring the sheet to said cylinder at such speed.

16. The method of feeding a stream of lapped sheets to the impression cylinder of a printing press, comprising the steps of advancing said sheets in stream formation toward said cylinder, initially retarding the forward motion of the foremost sheet, further advancing said sheet at such reduced speed, preliminarily front registering said sheet while it is traveling at such reduced speed, finally stopping the forward motion of said sheet to effect final front and side registration thereof while the sheet is at rest and still lapped by the trailing portion of a preceding sheet, thereafter initially accelerating said sheet in an arcuate path, further accelerating said sheet in a divergent arcuate path until it is traveling at cylinder speed, and transferring the sheet to said cylinder at such speed.

17. The method of feeding a stream of lapped sheets to the impression cylinder of a printing press, comprising the steps of advancing the sheets in lapped relation toward said cylinder, initially retarding the forward motion of the foremost sheet with respect to the succeeding sheets in the stream, further advancing said sheet at such reduced speed, effecting preliminary front registration of said sheet while it is advancing at such reduced speed and while a preceding sheet is being withdrawn, finally stopping the forward motion of the sheet, effecting the final front and side registration of the sheet while it is at rest and while it is still lapped by the trailing portion of a preceding sheet, initially accelerating the sheet in a downwardly curved path after the preceding sheet has been completely withdrawn, further accelerating said sheet in a diverging upwardly directed path until it is traveling at cylinder speed, and transferring the sheet to said cylinder at such speed.

References Cited in the file of this patent

UNITED STATES PATENTS

| | | |
|---|---|---|
| 2,095,276 | Wormser | Oct. 12, 1937 |
| 2,192,916 | Kaddeland | Mar. 12, 1940 |
| 2,309,979 | Pritchard | Feb. 2, 1943 |
| 2,317,993 | Harrold | May 4, 1943 |
| 2,642,282 | Backhouse | June 16, 1953 |